Feb. 1, 1938.   A. C. FISCHER   2,106,943
COMPOSITION MATERIAL
Original Filed Feb. 15, 1932
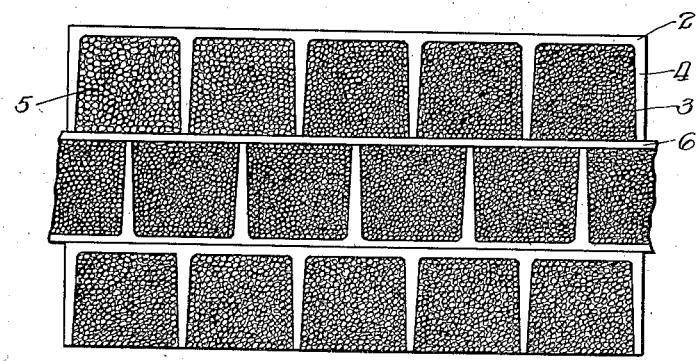
Inventor:—
Albert C. Fischer
By Albert H. Robinson
Atty.

Patented Feb. 1, 1938

2,106,943

UNITED STATES PATENT OFFICE 2,106,943

COMPOSITION MATERIAL

Albert C. Fischer, Chicago, Ill.

Application February 15, 1932, Serial No. 593,030
Renewed July 2, 1937

17 Claims. (Cl. 154—44)

This invention relates to composition material, particularly pertaining to a composite sheet comprising a single layer or two or more layers juxtaposed to provide a laminated structure.

The invention consists in the features, combinations, and compositions hereinafter described or claimed, for carrying out the above stated object and such other objects as will hereinafter appear in the description.

For a better understanding of the invention reference may be made to the accompanying drawing in which the single figure is a cross sectional view of one embodiment of the invention.

The invention in general pertains to cushioning and sound and thermal insulating structures, such as flooring, walls, expansion joints, or the like, where a high degree of cushioning or insulating quality is provided, yet the structure is of substantial rigidity. Small dead air cells formed with a wall or flooring structure provide excellent insulating qualities and also resilient qualities if the material in which the cells are formed is of inherently resilient material. However, in providing a cellular structure either in a rigid or resilient material, the strength of the mass is, of course, materially weakened. The aim of the present invention is to provide a structure which will provide a maximum insulating quality, and yet at the same time will be also substantially rigid.

Referring to the drawing, a composite sheet is disclosed comprising a foundation or base 2 provided with a series of recesses 3 on one side. The recesses may be continuous and interrupted longitudinally or transversely of the foundation or they may be set off into small squares or other forms by means of transverse and longitudinal ribs 4. As may be seen from the drawing, the ribs are of a height exceeding five times their average thickness. It may also be seen that they are spaced apart a distance approximately equal to their height. The foundation strip is preferably formed of substantially rigid material such as metal, ordinary dense rubber, wood, bituminous composition or the like, and then the recesses are filled with insulating material 5, such as sponged rubber, hair, felt and cork granules. All or part of the recesses may be filled with the insulating material, and then the recessed side may be overlaid with a cover sheet 6 integrally formed, as by vulcanization, or adhesively secured to the ribs and/or to the filling material.

The sheets may be used singly or two or more of them may be juxtaposed to build up a laminated structure of any desired thickness. The sheets may be juxtaposed with the recessed sides facing each other and offset as to the ribs with sheet 6 interposed therebetween, or they may be juxtaposed with the recessed side of one contacting with the plain surfaced side of the other and with the ribs staggered in off-set relations.

While I have illustrated and described one preferred embodiment in detail, it will be understood that the invention is not limited thereby. Various changes may be made in details of construction without departing from the spirit of the invention.

I claim:

1. A laminated structure comprising juxtaposed composite sheets, each of said sheets comprising a foundation provided on one face with a series of integrally formed projecting ribs of solid rubber and intervening recesses, and sponged rubber inserted within the recesses to provide cellular mass portions.

2. A laminated structure comprising juxtaposed composite sheets, each of said sheets comprising a foundation provided on one face with a series of projecting rubber ribs and intervening recesses, and sponged rubber of less compressive strength than the ribs within the recesses to provide cellular mass portions, the projecting ribs on the adjacent sheets being staggered.

3. A laminated structure comprising juxtaposed composite sheets, each of said sheets comprising a foundation provided on one face with a series of projecting solid rubber ribs and intervening recesses, and sponged rubber within the recesses to provide cellular mass portions, the sheets being juxtaposed with the recessed side of one sheet facing the non-recessed side of the other sheet.

4. A laminated structure comprising juxtaposed composite sheets, each of said sheets comprising a foundation provided on one face with a series of projecting solid rubber ribs and intervening recesses, and sponged rubber within the recesses to provide cellular mass portions, the sheets being juxtaposed with the recessed side of one sheet facing the recessed side of the other sheet.

5. A laminated structure comprising juxtaposed composite sheets, each of said sheets comprising a foundation provided on one face with a series of projecting solid rubber ribs and intervening recesses, and sponged rubber within the recesses to provide cellular mass portions, the sheets being juxtaposed with the recessed side of one sheet facing the recessed side of the other sheet, and a plain sheet interposed between the recessed faces.

6. A laminated structure, each lamination comprising a foundation sheet substantially covered with a cellular mass of substantially less compressive strength than the foundation sheet, and a plurality of thin ribs integral with the foundation sheet and extending normal thereto substantially through the cellular mass to strengthen the lamination against compression, the ribs being of a height exceeding five times their average thickness, and spaced apart a distance approximating their height.

7. A laminated structure, each lamination comprising a foundation sheet substantially covered with a cellular mass of substantially less compressive strength than the foundation sheet, and a plurality of thin ribs integral with the foundation sheet and extending normal thereto substantially through the cellular mass to strengthen the lamination against compression, the ribs being of a height exceeding five times their average thickness, and spaced apart a distance approximating their height, the laminations being juxtaposed with the ribs of adjacent laminations staggered.

8. A laminated structure, each lamination comprising a foundation sheet substantially covered with a cellular mass of substantially less compressive strength than the foundation sheet, and a plurality of thin ribs integral with the foundation sheet and extending normal thereto substantially through the cellular mass to strengthen the lamination against compression, the ribs being of a height exceeding five times their average thickness, and spaced apart a distance approximating their height, the laminations being juxtaposed with the ribs of adjacent laminations staggered, certain adjacent laminations having their foundation sheets positioned with the ribs extending away from each other.

9. A laminated structure, each lamination comprising a foundation sheet substantially covered with a cellular mass of substantially less compressive strength than the foundation sheet, and a plurality of thin ribs integral with the foundation sheet and extending normal thereto substantially through the cellular mass to strengthen the lamination against compression, the ribs being of a height exceeding five times their average thickness, and spaced apart a distance approximating their height, the laminations being juxtaposed with the ribs of adjacent laminations staggered, certain adjacent laminations having their foundation sheets positioned with the ribs extending towards each other.

10. A laminated structure each lamination comprising a solid rubber foundation sheet having integrally formed solid rubber ribs, forming, with the foundation sheets, substantially polygonal open top cavities closed at their base by the foundation sheet, the ribs being comparatively thin and a substantial distance apart whereby the total cross sectional area of the cavities along a plane parallel to the foundation sheet approximates the corresponding area of the foundation sheet the ribs being of a height approximating their distance apart, and a filling of spongy material in said cavities, said laminations being juxtaposed with the ribs of adjacent laminations offset with respect to each other.

11. A laminated structure, each lamination comprising a foundation sheet substantially covered with a cellular mass of substantially less compressive strength than the foundation sheet, and a plurality of thin resilient ribs extending normal to the foundation sheet substantially through the cellular mass to strengthen the lamination against compression, the ribs being of a height exceeding five times their average thickness, and spaced apart a distance approximating their height.

12. A laminated structure, each lamination comprising a foundation sheet substantially covered with a cellular mass of substantially less compressive strength than the foundation sheet, and a plurality of thin resilient ribs extending normal to the foundation sheet substantially through the cellular mass to strengthen the lamination against compression, the ribs being of a height exceeding five times their average thickness, and spaced apart a distance approximating their height, the laminations being juxtaposed with the ribs of adjacent laminations staggered.

13. A laminated structure, each lamination comprising a foundation sheet substantially covered with a cellular mass of substantially less compressive strength than the foundation sheet, and a plurality of thin resilient ribs extending normal to the foundation sheet substantially through the cellular mass to strengthen the lamination against compression, the ribs being of a height exceeding five times their average thickness, and spaced apart a distance approximating their height, the laminations being juxtaposed with the ribs of adjacent laminations staggered, certain adjacent laminations having their foundation sheets positioned with the ribs extending away from each other.

14. A laminated structure, each lamination comprising a foundation sheet substantially covered with a cellular mass of substantially less compressive strength than the foundation sheet, and a plurality of thin resilient ribs extending normal to the foundation sheet substantially through the cellular mass to strengthen the lamination against compression, the ribs being of a height exceeding five times their average thickness, and spaced apart a distance approximating their height, the laminations being juxtaposed with the ribs of adjacent laminations staggered, certain adjacent laminations having their foundation sheets positioned with the ribs extending towards each other.

15. A laminated structure, each lamination comprising a solid rubber foundation sheet having solid rubber ribs, forming, with the foundation sheets, substantially polygonal open top cavities closed at their base by the foundation sheet, the ribs being comparatively thin and a substantial distance apart, whereby the total cross sectional area of the cavities along a plane parallel to the foundation sheet approximates the corresponding area of the foundation sheet, the ribs being of a height approximating their distance apart, and a filling of spongy material in said cavities, said laminations being juxtaposed with the ribs of adjacent laminations offset with respect to each other.

16. A laminated structure, each lamination comprising a resilient foundation sheet substantially covered with sponged rubber, and a plurality of thin ribs carried by the foundation sheet and extending normal thereto substantially through the cellular mass, said ribs being formed of solid rubber to strengthen the lamination against compression, and being of a height exceeding five times their average thickness, and spaced apart a distance approximating their height.

17. A laminated structure, each lamination comprising a resilient foundation sheet substantially covered with sponged rubber, and a plurality of thin ribs carried by the foundation sheet and extending normal thereto, substantially through the cellular mass, said ribs being formed of solid rubber to strengthen the lamination against compression, and being of a height exceeding five times their average thickness, and spaced apart a distance approximating their height, the laminations being juxtaposed with the ribs of adjacent laminations staggered.

ALBERT C. FISCHER.